March 12, 1963 H. G. CHINN 3,081,213
EDGE COATING
Original Filed May 2, 1958 2 Sheets-Sheet 1
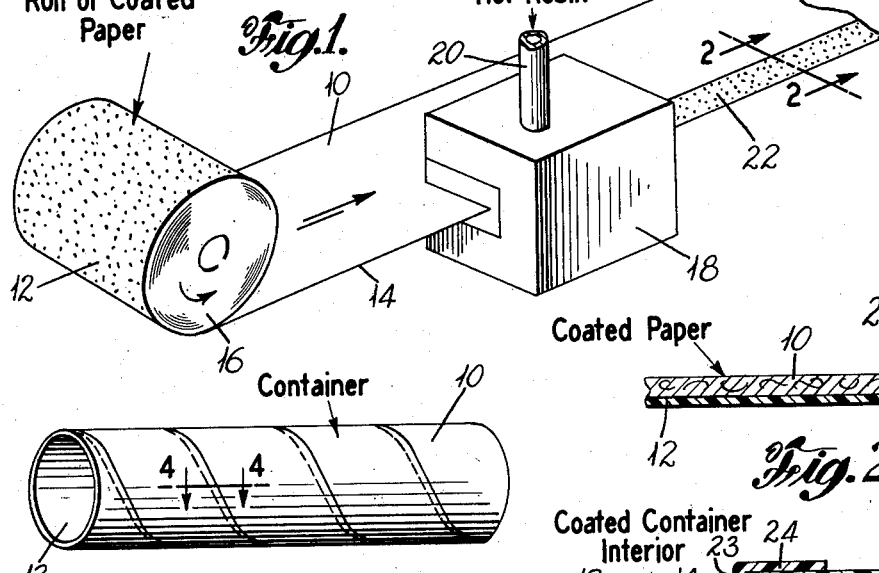
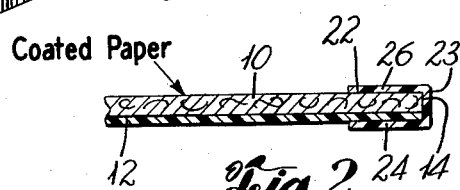
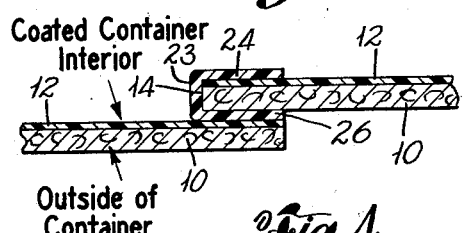
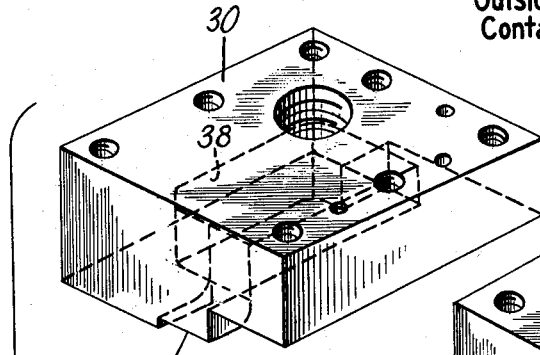
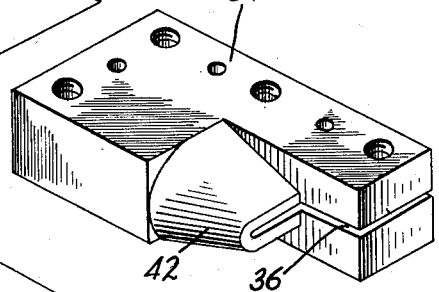
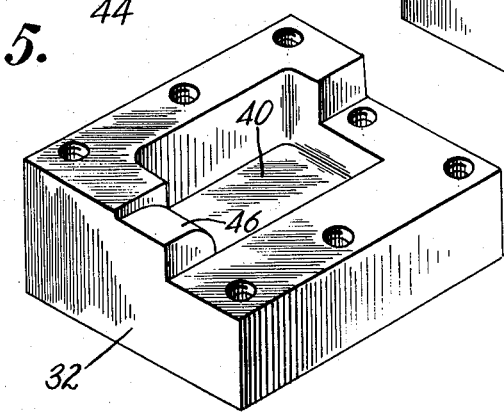
INVENTOR.
HARRY G. CHINN
BY Richard S. Shreve, Jr.
ATTORNEY INVENTOR.
HARRY G. CHINN
BY Richard S. Shreve Jr.
ATTORNEY

United States Patent Office 3,081,213
Patented Mar. 12, 1963

3,081,213
EDGE COATING
Harry G. Chinn, Somerville, N.J., assignor to Union Carbide Corporation, a corporation of New York
Original application May 2, 1958, Ser. No. 732,544. Divided and this application Apr. 13, 1960, Ser. No. 24,867
2 Claims. (Cl. 156—192)

This invention relates to edge coating, and more particularly to method and apparatus for coating the edge of sheet material, and to the product so obtained.

This application is a division of my parent case Serial No. 732,544 filed May 2, 1958, now abandoned.

Bags, cartons, spiral and convolute wound tubes, and containers of many sorts which are surfaced on one or both sides with a thermoplastic resin composition, particularly with polyethylene resin compositions, are finding ever increasing use in the packaging of comestibles, hardware items, machine parts, chemicals and divers other commodities. Such containers are most economically fabricated from paper, cardboard, fabrics made of natural or synthetic fibers, metal foil and other sheet-like materials which have been coated with, laminated to, or otherwise surfaced, on one or both sides, with a film of the thermoplastic resin composition, or from more complex, resin coated, multi-ply, laminated, sheet-like structures.

An uninterrupted, continuous resin film serves as an inert, chemically resistant, moisture and vapor impermeable barrier which protects the sheet-like material from the packaged material, and simultaneously, guards the package contents from contamination by the sheet material and against spoilage by atmospheric or other external agents. However, there is almost invariably present in such containers—and in many other articles fabricated from resin coated sheets, such as rainwear and the like—one or more sheet edges which, since they are uncoated, represent a discontinuity in the resin layer and permit the package contents to come into contact with the sheet material and the external environment, sometimes allow leakage from the package, frequently destroy the completely moisture-proof nature of the container, and otherwise prevent the resin coating from fulfilling its proper function. These edge effects are particularly severe when the contents of the package are liquids or foodstuffs or the like, and frequently render such packages unacceptable for said type materials.

It is, therefore, the main object of the present invention to coat such edge with a thermoplastic resin composition, particularly with a polyethylene resin composition.

According to the present invention, a substantially U- or V-shaped coating of hot thermoplastic materials is extruded onto at least one uncoated edge of sheet material.

The method is extremely versatile in that the coating material can be of any extrudable composition, such as polyethylenic or vinyl resin compositions or the like. Such an edge coating can be applied to virtually any sheet-like material of either single-ply or multi-ply construction and regardless of its thickness, as for example, paper, metal foil, coated paper, resin coated laminates, etc. The thickness of the coating and the width of the edge-abutting, sheet-surface margins which are coated can be predetermined and controlled. Additional advantages will become apparent from the following consideration of certain specific applications wherein the novel, edge coated webs of this invention are particularly useful.

The long seal of a bag made from plastic coated paper is, in its strongest form, an overlap seal. There is normally present inside of a so-sealed bag, an uncoated edge of paper which runs the full length of the bag. Furthermore, a very large volume of bags are fabricated from paper coated on one side only, say with polyethylene. Hence a polyethylene-to-paper bond must be effected to make the seal. By edge coating the plastic coated paper by the method of this invention, the interior raw edge is eliminated and the seal is formed by effecting a plastic-to-plastic bond which is much more easily and more reliably accomplished than a plastic-to-paper bond.

Further, if such bags are used to contain liquid, the raw edge of the paper acts as a wick, which is undesirable both per se and because it induces staining which renders the container unsightly. Moreover, materials eluted from the paper fibers can sometimes contaminate the contents of the package during long storage periods.

Similar benefits are apparent in coated boxboard containers, convolute and spirally wound tubular containers, and the like. In such cases, the use of a sheet which has been edge coated by the instant method provides a completely continuous plastic coating on the inside of the container, and simultaneously, provides plastic-to-plastic surfaces for bonding. Furthermore, the edge coating process lends itself to the simultaneous sealing of these seams in the container manufacturing process; and said sealing operation requires no apparatus or adhesive other than the die and hot melt used to edge coat the web.

In the drawings:

FIG. 1 is a diagrammatic isometric view of apparatus according to, and for carrying out the method of, the preferred embodiment of the present invention;

FIG. 2 is a section taken along the line 2—2 of FIG. 1;

FIG. 3 is a pictorial view of the preferred embodiment of a product;

FIG. 4 is a section taken along the line 4—4 of FIG. 3;

FIG. 5 is an exploded view of the die shown in FIG. 1;

Figure 6:
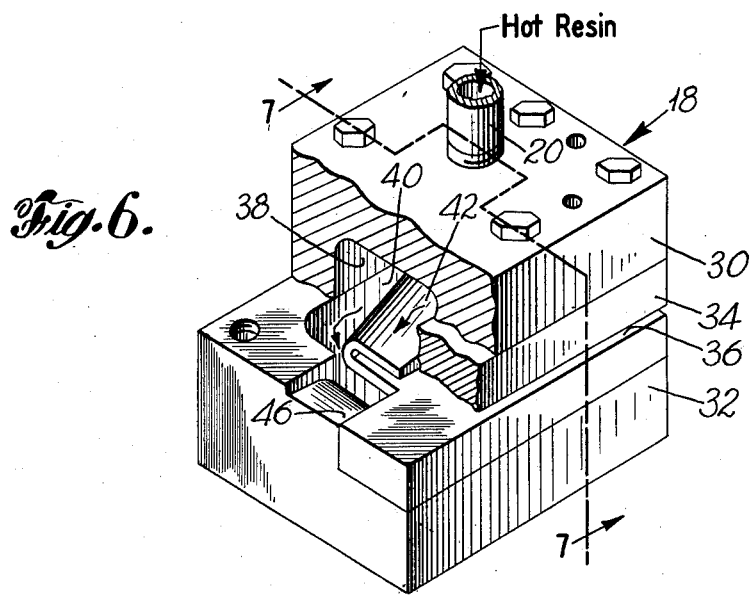
FIG. 6 is an assembled view of the die shown in FIG. 5.

The edge-coating die described hereinafter may be installed on a conventional extruder. It may then be so used; or in conjunction with a single roll over which the edge-coated web is passed in tension; or inconjunction with a pair of pressure rolls in an arrangement such as described in the copending application of W. A. Haine and myself, Serial No. 594,929, filed November 29, 1956, i.e., by substituting said die for the bead sealing die. In other words, the extruded edge coating may be adhered adequately to the web merely by extrusion thereonto, or by extruding and subsequently urging said extruded coating against one or against both surfaces of the web, respectively.

In the preferred embodiment, the extrusion die consists of a shell and a guide mounted in the shell in such manner as to provide between the shell and the guide a chamber for hot resin. A resin feed or inlet tube delivers the hot resin from the extruder into the die chamber.

As shown in FIG. 1, sheet material 10 which has been coated on one side with thermoplastic composition 12 but has an exposed or uncoated edge 14, is withdrawn from a supply roll 16 and passed through an edge coating die 18. Hot thermoplastic material is supplied to the die 18 from an extruder (not shown) through die inlet tube 20.

The die 18 extrudes a shaped coating 22 of hot thermoplastic material onto the uncoated edge 14 and fused thereto, and overlapping the adjacent surfaces of the sheet material 10 and fused thereto. The coating 22 is preferably shaped like a beam section such as an angle or channel, so that the portion 23 thereof engaging the exposed edge 14 may be the apex portion of an angle or the web of a channel. The portions 24 and 26 overlapping the adjacent sheet surfaces are the legs or flanges of such angle or channel, respectively.

The entire coating including the crown portion and both leg or flange portions, is firmly adhered to the sheet at the sheet edge and at the sheet margins adjacent thereto. If one or both sheet surfaces is coated, for example, with thermoplastic, then the mating portions of such coating and of the edge coating are actually fused together.

As shown in FIG 5, the die 18 comprises an outer casing consisting conveniently of a top shell 30 and a bottom shell 32, and a sheet guide core 34 having a slot 36 through which the sheet 10 passes. The shells 30 and 32 have complementary registering cavities 38 and 40, and the core 34 has a substantially conical outer surface 42 forming with the cavities 38 and 40 a hot resin chamber.

Figure 8:
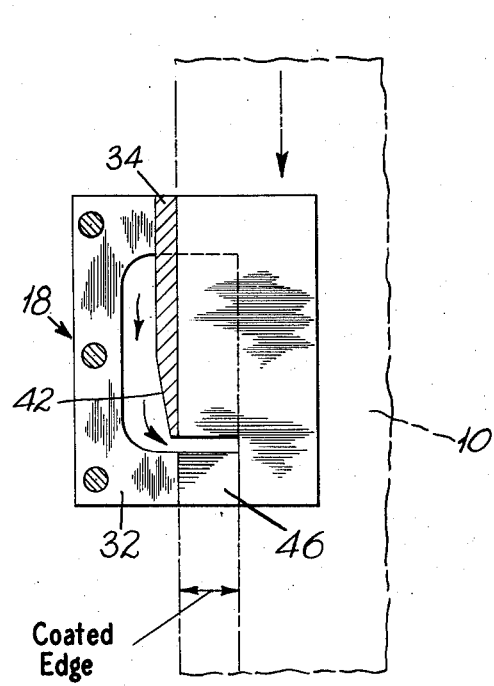
FIG. 8 is a horizontal section taken along the line 8—8 of FIG. 7.
Figure 7:
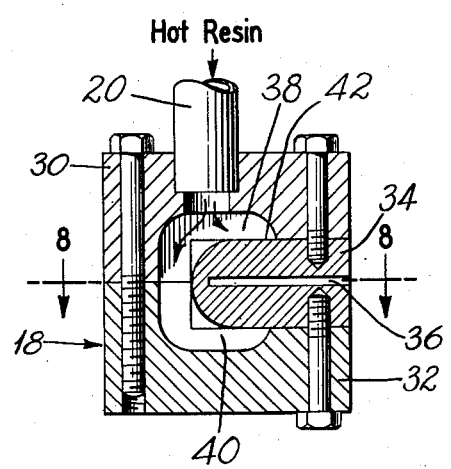
FIG. 7 is a vertical section taken along the line 7—7 of FIG. 6.

As shown in FIG. 8, the conical surface 42 terminates short of the front of the cavities 38 and 40, so that the hot resin from the hot resin chamber contacts the edge and both sides of the sheet 10. As shown in FIG. 5, the shells 38 and 40 have registering grooves 44 and 46 forming an extrusion slot the dimensions of which partially determine the dimensions of the applied edge coating 22.

The edge-coating die described above was installed, with its guide slit disposed horizontally in the molten bead sealer apparatus described in the aforesaid copending application, in place of the bead sealing die. A roll of 5 mil thick kraft paper carrying a one mil thick coating of polyethylene on one side was placed on the machine. Some runs were made with the plastic coating facing down and others with the plastic coating facing up, both with equally good results. Prior to starting the extruder screw, the extruder barrel was heated to the temperature required to provide a free flowing resin melt. This compound temperature depends on the particular resin composition employed. For polyethylenic compositions, temperatures between about 200° C. and about 300° C. generally give the best results. In this particular run, the rear and middle sections of the extruder barrel were maintained at 100 and 250° C., respectively, and the front section of the barrel and the die were maintained at 300° C. The resin employed was a commercial polyethylene resin having a melt index of 2 and a density of 0.918 g./cc. at 23° C. (Bakelite Company's "DYNH-3").

The paper was then threaded through the die slit and drawn through at speeds ranging from about 50 to 70 feet per minute, at which web speeds the resin extrusion rate ranged from about 3.5 to 4 pounds per hour. The resin flow rate was adjusted to the speed of the paper until a thin coating of hot melt was placed on both sides of the paper and over the edge. On the coated side of the paper, a ½ inch wide by 3.25 mil thick skirt blended evenly with the original coating; and on the uncoated side of the paper, a ½ inch wide by 3.25 mil thick coating of polyethylene, which was strongly adhered to the surface of the paper, was laid onto the edge portion of said paper surface.

On examination of the samples produced, it was observed that the edge of the newly made coating protruded slightly beyond the edge of the paper. It was found that this overlap could be increased or decreased as desired by respectively increasing or decreasing the resin flow rate relative to the paper speed through the die, whereby, in effect, the thickness of the crown portion of the edge coating was adjustable.

At the process speeds quoted above, sufficient heat remained in the so-applied edge coating to form strong bonds with other coated samples as far as 30 inches from the die.

The samples cited above were made with air cooling only; but water cooled rollers can be used, if desired, to set the hot melt in shorter distances.

When the edge-coated sheet so formed was spirally wound into a container with the coating 12 inside, as shown in FIG. 3, the coating flange 26 overlying and fused to the uncoated outer surface of the sheet 10 was firmly fused to the coating 12 of the next convolution of the sheet 10 thereover, as shown in FIG. 4, to provide the container with a continuous thermoplastic inner surface.

What is claimed is:

1. Method of forming a strong, moisture-proof bond between margins of sheet material coated on at least one side with thermoplastic resin composition, which comprises continuously sealing an edge of paper-thin, smooth-surfaced, dense homogeneous sheet material by continuously withdrawing said material from a supply roll and passing it along a rectilinear path, continuously extruding a hollow mass of hot thermoplastic resin material having an interior converging in the direction of said path and channel shaped in cross section with upper and lower flats and a connecting web, continuously directing said web onto said edge and said flats onto said sheet surface margins adjacent said edge at a point in said rectilinear path and continuously adhering said coating to said edge and said margins as they pass beyond said point and on along said rectilinear path, and progressively applying said edge-coated margin over another surface coated margin in overlapping relation therewith while sufficient heat remains in said edge coated margin to form strong bonds to fuse the edge coating of the first margin to the surface coating of the second.

2. A method of forming a strong, moisture-proof bond between margins of sheet material coated on at least one surface with a thermoplastic resin composition, which comprises continuously extruding a hollow mass of hot thermoplastic resin material having an interior converging toward said sheet material and angle shaped in cross section with a flat and a flange connected thereto, continuously directing said flat onto one edge and the flange onto the uncoated margin adjacent said edge, and spirally winding said sheet with the coating inside and the coating flange overlying and fused to the uncoated outer surface of said sheet, and fusing said flange to the coating of the next convolution of the sheet.

References Cited in the file of this patent
UNITED STATES PATENTS

| | | |
|---|---|---|
| 2,115,368 | Tustberg | Apr. 26, 1938 |
| 2,138,699 | Hinze | Nov. 29, 1938 |
| 2,293,252 | Foster | Aug. 18, 1942 |
| 2,354,426 | Briant | July 25, 1944 |
| 2,415,721 | Arner | Feb. 11, 1947 |
| 2,550,520 | Bennett | Apr. 24, 1951 |
| 2,555,380 | Stuart | June 5, 1951 |
| 2,623,444 | Maier | Dec. 30, 1952 |
| 2,677,633 | Gross | May 4, 1954 |
| 2,748,044 | Seiler | May 29, 1956 |
| 2,757,709 | Crabbe | Aug. 7, 1956 |
| 2,786,622 | Ross | Mar. 26, 1957 |
| 2,821,497 | Works | Jan. 28, 1958 |
| 2,874,752 | Brey | Feb. 24, 1959 |